United States Patent
Sancho Díaz et al.

(10) Patent No.: US 10,864,603 B2
(45) Date of Patent: Dec. 15, 2020

(54) METHOD AND SYSTEM FOR HEAT TREATMENT OF SHEET METAL

(71) Applicant: IKERGUNE A.I.E., Elgoibar (ES)

(72) Inventors: Paula Sancho Díaz, Elgoibar (ES); Javier Díaz Rozo, Elgoibar (ES); Jesús Domínguez Cobreros, Elgoibar (ES)

(73) Assignee: IKERGUNE A.I.E., Elgoibar (ES)

( * ) Notice: Subject to any disclaimer, the term of this patent is extended or adjusted under 35 U.S.C. 154(b) by 409 days.

(21) Appl. No.: 15/559,384

(22) PCT Filed: Mar. 15, 2016

(86) PCT No.: PCT/EP2016/055612
§ 371 (c)(1),
(2) Date: Sep. 18, 2017

(87) PCT Pub. No.: WO2016/146646
PCT Pub. Date: Sep. 22, 2016

(65) Prior Publication Data
US 2018/0071864 A1    Mar. 15, 2018

(30) Foreign Application Priority Data
Mar. 17, 2015    (EP) .................................. 15382122

(51) Int. Cl.
*B23K 26/073*    (2006.01)
*B23K 26/359*    (2014.01)
(Continued)

(52) U.S. Cl.
CPC .......... *B23K 26/359* (2015.10); *B23K 26/073* (2013.01); *B23K 26/082* (2015.10);
(Continued)

(58) Field of Classification Search
None
See application file for complete search history.

(56) References Cited

U.S. PATENT DOCUMENTS

| 3,848,104 A | 11/1974 | Locke |
| 3,952,180 A | 4/1976 | Gnanamuthu |

(Continued)

FOREIGN PATENT DOCUMENTS

| CN | 103215411 A | 7/2013 |
| CN | 103290176 A | 9/2013 |

(Continued)

OTHER PUBLICATIONS

International Search Report dated Jun. 6, 2016 re: Application No. PCT/EP2016/055612; pp. 1-3.
(Continued)

*Primary Examiner* — George Wyszomierski
(74) *Attorney, Agent, or Firm* — Cantor Colburn LLP

(57) ABSTRACT

A method for heat treatment of an object of sheet metal, including heating at least one selected portion of the object using an energy beam, where the beam is projected onto a surface of the object so as to produce a primary spot on the object, the beam being repetitively scanned in two dimensions in accordance with a first scanning pattern so as to establish an effective spot on the object, the effective spot having a two-dimensional energy distribution, where the effective spot is displaced in relation to the surface of the object to progressively heat said at least one selected portion of the object.

25 Claims, 12 Drawing Sheets

(51) Int. Cl.
    *C21D 1/09*     (2006.01)
    *B23K 26/082*     (2014.01)
    *C21D 9/46*     (2006.01)
    *B23K 101/00*     (2006.01)
    *C21D 9/48*     (2006.01)
    *C21D 1/673*     (2006.01)

(52) U.S. Cl.
    CPC ................ *C21D 1/09* (2013.01); *C21D 9/46* (2013.01); *B23K 2101/006* (2018.08); *C21D 1/673* (2013.01); *C21D 9/48* (2013.01); *C21D 2221/00* (2013.01); *C21D 2221/02* (2013.01)

(56) References Cited

U.S. PATENT DOCUMENTS

| | | | |
|---|---|---|---|
| 4,313,771 | A | 2/1982 | Lorenzo et al. |
| 4,456,811 | A * | 6/1984 | Hella ................ B23K 26/0734 148/565 |
| 4,797,532 | A | 1/1989 | Maiorov |
| 5,446,258 | A | 8/1995 | Mordike |
| 5,705,788 | A | 1/1998 | Beyer et al. |
| 5,786,924 | A * | 7/1998 | Black ................... A61B 18/203 359/197.1 |
| 7,070,228 | B2 | 7/2006 | Shimizu et al. |
| 8,272,681 | B2 | 9/2012 | Gucker et al. |
| 8,480,163 | B2 | 7/2013 | Mori |
| 8,555,507 | B2 | 10/2013 | Lee et al. |
| 8,847,126 | B2 | 9/2014 | Ishiguro et al. |
| 2002/0069945 | A1 | 6/2002 | Streubel et al. |
| 2002/0096503 | A1 | 7/2002 | Hackel et al. |
| 2003/0080098 | A1 | 5/2003 | Yamazaki et al. |
| 2003/0132208 | A1 | 7/2003 | Cutler |
| 2004/0108306 | A1 | 6/2004 | Wiezbowski |
| 2004/0244529 | A1 | 12/2004 | Toplack |
| 2005/0237895 | A1 | 10/2005 | Tanaka et al. |
| 2008/0053384 | A1 | 3/2008 | Haake et al. |
| 2008/0229877 | A1 | 9/2008 | Iwasaki et al. |
| 2009/0032510 | A1 | 2/2009 | Ando et al. |
| 2009/0272464 | A1 | 11/2009 | Hamamura et al. |
| 2010/0086803 | A1 | 4/2010 | Patberg |
| 2010/0126642 | A1 | 5/2010 | Brenner et al. |
| 2012/0237387 | A1 | 9/2012 | Santacreu et al. |
| 2012/0312159 | A1 | 12/2012 | Liu et al. |
| 2015/0321286 | A1 * | 11/2015 | Heinemann ........ B23K 26/0622 219/121.76 |
| 2016/0076115 | A1 | 3/2016 | Zeng et al. |
| 2016/0312328 | A1 * | 10/2016 | Badirujjaman ........... C21D 9/46 |
| 2019/0002997 | A1 | 1/2019 | Gabilondo et al. |

FOREIGN PATENT DOCUMENTS

| | | |
|---|---|---|
| CN | 103484653 A | 1/2014 |
| DE | 2018793 A | 11/1971 |
| DE | 242358 A1 | 1/1987 |
| DE | 256274 A1 | 5/1988 |
| DE | 256275 A1 | 5/1988 |
| DE | 4018355 A1 | 6/1990 |
| DE | 3905551 A1 | 8/1990 |
| DE | 291717 A5 | 7/1991 |
| DE | 4142216 A1 | 7/1991 |
| DE | 4241592 C1 | 12/1992 |
| DE | 4123577 A1 | 1/1993 |
| DE | 4126351 A1 | 11/1993 |
| DE | 4209938 C1 | 12/1993 |
| DE | 4430220 C2 | 2/1996 |
| DE | 19853733 C1 | 2/2000 |
| DE | 102004023579 A1 | 12/2005 |
| DE | 102005005141 B3 | 6/2006 |
| DE | 102006031273 A1 | 1/2008 |
| DE | 102008020794 A1 | 8/2009 |
| DE | 10118291 C5 | 7/2010 |
| DE | 102009057390 A1 | 5/2011 |
| DE | 10261710 B4 | 7/2011 |
| DE | 102010048645 A1 | 4/2012 |
| DE | 102010049330 A1 | 4/2012 |
| DE | 102011118285 A1 | 8/2012 |
| DE | 102011054866 A1 | 5/2013 |
| DE | 102013008494 A1 | 3/2014 |
| EP | 0060257 B1 | 9/1982 |
| EP | 0698800 A1 | 2/1996 |
| EP | 0822027 B2 | 2/1998 |
| EP | 0965516 A1 | 12/1999 |
| EP | 1308525 A2 | 5/2003 |
| EP | 1972694 A2 | 9/2008 |
| EP | 2309126 A1 | 4/2011 |
| EP | 2541093 A1 | 1/2013 |
| EP | 2561946 A1 | 2/2013 |
| EP | 2565489 A1 | 3/2013 |
| EP | 2570205 A1 | 3/2013 |
| FR | 2825375 A1 | 12/2002 |
| GB | 2370584 A | 7/2002 |
| JP | 57085931 A | 5/1982 |
| JP | 59164817 U | 11/1984 |
| JP | 6158950 S | 3/1986 |
| JP | S627821 A | 1/1987 |
| JP | 03122212 A | 5/1991 |
| JP | 04141522 A | 5/1992 |
| JP | 06226479 A | 8/1994 |
| JP | 2003231914 A | 8/2003 |
| JP | 2004084931 A | 3/2004 |
| JP | 2008202438 A | 9/2008 |
| JP | 2012144768 A | 8/2012 |
| WO | 91188705 A1 | 12/1991 |
| WO | 2012025171 A1 | 3/2012 |
| WO | 2012156084 A1 | 11/2012 |
| WO | 20 14037281 A2 | 3/2014 |
| WO | 2014037281 A2 | 3/2014 |
| WO | WO-2015/179747 * | 11/2015 |

OTHER PUBLICATIONS

Written Opinion dated Jun. 6, 2016 re: Application No. PCT/EP2016/055612; pp. 1-5.
CN Office Action dated Nov. 6, 2017 re: Application No. 201580013179.7; pp. 1-23.
CN Office Action dated Dec. 3, 2018 re: Application No. 201680024356.6, pp. 1-20.
Dr. Steffen Bonβ, "System components create reliable processes", Mar. 27-28, 2012, pp. 1-48.
European Intention to Grant for European Application No. 16714258.7, Aplication Filing Date Mar. 15, 2016, dated Feb. 26, 2019, 86 pages.
European Search Report for European Application No. 15382122.8; Application Filing Date: Mar. 17, 2015; dated Jun. 9, 2015; 5 pages.
F. Vollertsen, et al., "State of the art of Laser Hardening and Cladding", Proceedings of the Third International WLT-Conference on Lasers in Manufacturing 2005, Munich, Jun. 2005.
H. Koehler et al. "Laser reconditioning of crankshafts: From lab to application", ScienceDirect, Physics Procedia, 2010, vol. 5, pp. 387-397.
Hideki Hagino, et al, "Design of a computer-generated hologram for obtaining a uniform hardened profile by laser transformation hardening with a high-power diode laser", Precision Engineering 34 (2010) 446-452.
International Preliminary Report on Patentability for International Application No. PCT/EP2016/055612; International Filing Date Mar. 15, 2016; dated Sep. 19, 2017; 6 pages.
Klaus Müller "Metallurgical qualification of edge layer hardening with laser beam", Herbert Utz Publication, Science Munich, 1999, pp. 1-8.
Klocke, et al., "Flexible scanner-based laser surface treatment", Science Direct, Physics Procedia 5 (2010) 467-475.
M. Seifert, et al., "High Power Diode Laser Beam Scanning in Multi-Kilowatt Range", Proceedings of the 23rd International Congress on Applications of Lasers and Electro-Optics 2004.
Marko Seifert et al. "High-Speed and Camera Based Temperature Measurement and Control for High Power Laser Scanning Systems", Proceedings of the 2nd Pacific International Conference on Application of Laswers and Optics, 2006, pp. 1-6.

(56) References Cited

OTHER PUBLICATIONS

Marko Seifert, "The range of process variants for laser heat treatment with precises temperature control", 9th Workshop Industrial Application of High-Power Diode Lasers, Mar. 27-28, 2012, pp. 1-72.

Markus Seifert et al. "Dynamic beam shaping for high-power diode lasers up to 4kW", Fraunhofer IWS Dresden Oct. 21-22, 2004, pp. 1-44.

Program 9th Workshop "Industrial applications of high-power diode lasers", Mar. 27-28, 2012, pp. 1-40.

S M Shariff, "Laser Surface Hardening of Crankshaft", International Advanced research center for powder metallurgy and new materials (ARCI), SAE 2009-28-0053 Copyright 2009.

S. Bonβ et al., "Novel machine system for simultaneous heat treatment with dynamic beam shaping", Conference on Laser Materials Processing in the Nordic Countries (NOLAMP), 2007, pp. 1-10.

S. Bonβ, "Laser-beam hardening—Integration into production makes proceses more streamlined", Z. Werkst. Warmebeh. Fertigung 63, 2008, vol. 3.

Seifert, et al., "High Power Diode Laser Beam Scanning in Multi-Kilowatt Range", Proceedings of the 23rd International Congress on Applications of Laysers and Electro-Optics 2004, 6 pages.

Shakeel SAFDAR et al., "An Analysis of the Effect of Laser Beam Geometry on Laser Transformation Hardening", Journal of Manufacturing Science and Engineering, Aug. 2006, vol. 128, pp. 659-667.

Stefan Jahn "Applications of laser hardening in series production of crankshafts", Mar. 28, 2012, pp. 1-76.

Steffen Bonβ "Laser-beam hardening—Integration into production makes processes streamlined", Automobile Industry Laser Hardening, 2007, vol. 6, No. 9, pp. 1-8.

Steffen Bonβ et al. "Integrated Heat Treatment Comparison of Different Machine Concepts", Fraunhofer IWS Dresden, Institut Werkstoff-und Strahltechnik, ICALEO 2006, pp. 1-34.

Steffen Bonβ et al., "Integrated Laser Beam Hardening in Turning Machines for Process Chain Reduction", Rexroth Bosch Group, 2008, pp. 1-10.

Wikipedia "Full width at half maximum", 2018, pp. 1-2.

\* cited by examiner

METHOD AND SYSTEM FOR HEAT TREATMENT OF SHEET METAL

TECHNICAL FIELD

The present invention relates to the heat treatment of sheet metal, for example, sheet metal for use in or used in metal products, for example, in structural components for vehicles, such as motor vehicles.

BACKGROUND

It is known in the art to subject metal to heat treatment. For example, it is well known in the art to harden ferrous materials, such as steel (for example, medium carbon steel), by heating the material to a high temperature, below its melting temperature, and subsequently quenching it, that is, cooling it rapidly enough to form hard martensite. Heating can take place in furnaces or by induction heating, and cooling can take place by applying a cooling fluid, such as water or water mixed with other components. It is also known to use laser light for carrying out certain hardening process, for example, in relation to complex products such as crankshafts. Crankshafts have complex surfaces and very high requirements on the resistance to wear during use. For example, WO-2014/037281-A2 explains how a laser beam can be used for the hardening of the surfaces of journals of a crankshaft, without producing overheating of the areas adjacent to the oil lubrication holes.

It is also known to apply heat treatment to sheet metal and to sheet metal components, so as to provide them with desired properties, for example, in terms of hardness, stiffness, softness and/or ductility. For example, in the field of motor vehicles, it is known to produce many components, including structural components of the vehicle body such as pillars, rails and floor rockers, out of sheet metal, and the manufacturing steps frequently include steps for heat treatment to provide the components with desired characteristics in terms of hardness, softness, ductility. Often, these characteristics are chosen to provide for a desired performance in the case of a crash, in order to minimize the risk for severe damage to the occupants of the vehicle.

DE-102013008494-A1 discloses a method for producing a metal vehicle component including the steps of localized heating of a sheet metal workpiece in a first heating station, shaping the workpiece in a first shaping station using a tool for cold forming of workpieces, and heating the shaped workpiece in a second heating station to provide it with desired mechanical characteristics. It is explained that thereby, it is possible to provide high strength components for vehicles, components that feature a ductility which, at least in certain regions, is enhanced due to the heating in the second station. This is desirable in order to provide for an adequate performance in the case of a crash.

DE-102011118285-A1 likewise discloses heat treatment of a metallic vehicle component, more specifically, of a semi-finished or finished product of an aluminum alloy, in order to provide for a desired performance in the case of a crash. This is achieved by subjecting the product or the semi-finished product to heat treatment in a selected area, to increase the ductility in that area. DE-102011118285-A1 suggests heating by induction but also mentions to option of heating using a laser or a gas burner.

DE-102011054866-A1 explains how it was known in the art to produce high strength steel components by hot forming a workpiece, whereby the workpiece is heated above the austenization temperature, shaped in a press, and cooled for quenching. It is explained that the high strength can render further operations on the hardened object, such as the establishment of perforations, difficult. DE-102011054866-A1 addresses this by carrying out the shaping step so that certain areas protrude, whereafter the protruding portion can be removed in a separate step.

EP-2570205-A1 teaches how a sheet metal or steel plate can be shaped in a press, with an arrangement that allows for selected heating and/or cooling, such as to provide selected areas of the shaped object with desired characteristics in terms of hardness and/or ductility.

U.S. Pat. No. 8,847,126-B2 teaches hot pressing and hardening, wherein the heating is carried out so that different regions are heated differently, by using electromagnetic radiation for heating and applying a plate member which shields, absorbs and/or reflects the applied electromagnetic wave.

U.S. Pat. No. 8,480,163-B2 teaches a vehicle center pillar provided with two weak portions. It is explained that this can be obtained by avoiding quenching of these portions. This can be achieved by adapting the way in which the cooling water cools different portions of the member during manufacture.

U.S. Pat. No. 7,070,228-B2 refers to a press formed article such as a center pillar or the like, with regions featuring different levels of hardness. U.S. Pat. No. 7,070,228-B2 is focused on induction hardening.

It appears to be well known in the art of sheet metal products to harden the sheet metal during the formation stage, in a way that provides for different and selected levels of hardness in different and selected areas, regions or portions of the product. However, it appears that this frequently requires a complex design of the equipment or hardware used, and that modifications of the product and its characteristics, for example, in terms of the distribution of the regions or portions that feature different hardnesses, frequently requires substantial changes in the hardware used.

US-2002/0069945-A1 teaches a method for manufacturing structural parts for automobile body construction, including hardening by inductive heating followed by cooling.

US-2012/0237387-A1 teaches how a steel member can be provided with portions of lesser mechanical resistance using, for example, laser light.

U.S. Pat. No. 8,272,681-B2 teaches how a profile component can be provided with regions that are hardened and other regions that are not hardened. The use of laser light is suggested to be useful for heating a comparatively small spatially delimited region of a sheet metal semi-finished product.

DE-102004023579-A1 teaches heating of a hard steel component to produce softer regions, so as to allow for the use of conventional assembly means such as welding when assembling the component. A laser can be used to produce the heating.

US-2010/0086803-A1 teaches how a hot-formed and press-hardened metal component can be heat treated so as to facilitate bending, using a laser beam.

WO-2012/156084-A1 teaches a method for heat treating a hardenable sheet metal component, in particular for a motor vehicle. The method consists of press hardening the sheet metal component in a forming tool, removing the sheet metal component from said forming tool, and forming locally defined soft areas of the sheet metal component by locally tempering predetermined sub-areas of the sheet metal component using a laser beam.

DE-102010049330-A1 teaches how profile components for vehicles are shaped and how they subsequently are subjected to a heat treatment using laser light, wherein portions are hardened by heating followed by cooling.

EP-2541093-A1 and EP-2565489-A1 relate to heat treatment of impact absorbing members in vehicles using laser light.

JP-6-226479-A discusses butt welding of a front pillar part and a center pillar part, etc. Softened parts are provided through a softening treatment using a laser beam near peripheral parts of the metal sheet.

U.S. Pat. No. 8,555,507-B2 teaches how a rigid vehicle component formed by hot stamping is provided with areas of lower rigidity by laser heat treatment, thereby improving the collision absorption performance.

WO-2012/025171-A1 likewise relates to heat treatment of a profiled component for vehicles, using laser light or induction heating.

EP-2561946-A1 teaches the use of a diode laser beam to convert a localized zone in a hot stamped vehicle component into an energy absorption zone in the event of a collision.

FR-2825375-A1 teaches localized hardening of structural metal sheets using induction or diode lasers.

In traditional laser heat treatments of metal, the laser beam is typically scanned once over the region to be treated. A typical example is shown in FIG. 7 of the above-mentioned document US-2012/0237387-A1, in which a steel sheet is moved in relation to a laser source, so that a plurality of heat treated tracks are established, with widths corresponding to the width of the laser beam.

EP-1308525-A2 and U.S. Pat. No. 4,797,532-A teach how laser heating of a track substantially wider than the width of the laser beam can be achieved by combining a relative movement between the surface to be heated and the laser beam in one direction, with a back-and-forth movement in another direction perpendicular to the first direction, so that the projected laser spot follows a sinusoidal or meandering path on the surface of the workpiece.

Something similar is suggested in US-2005/0237895-A1.

On the other hand, EP-0965516-A1 teaches, in the context of laser hardening of selected portions of a fifth wheel plate, the use of optics for establishing the desired cross section of the laser beam, including the distribution of power over the cross section.

DE-3905551-A1 teaches, in the context of the hardening of crankshafts, the use of optics for adapting the power distribution over the cross section of the laser beam to the geometry of the surface being hardened.

In the context of heat treatment of sheet metal objects, including flat pieces or plates of sheet metal, sheet metal supplied from a roll, and objects shaped from sheet metal using, for example, hot or cold stamping processes and tools, the heated areas are sometimes arranged as bands or strips having a substantially constant width. This applies both to hardening and to tempering, for example, tempering of a previously hardened object to establish selected areas where the material is softer and/or more ductile. However, even so, heating the entire track in the same way may be suboptimal, for example, at the beginning and the end of the track, where the cooling due to the conduction of heat differs from the one in the middle of the track. The same applies where there are changes in the surface configuration of the workpiece, for example, due to the presence of protrusions, curvatures, bores, etc. Also, when heating an object using an energy beam, changes in the angle between the beam and the surface portion being heated, for example, due to the shape of the object such as due to the presence of curvatures, bends, portions placed at an angle in relation to each other, etc., can give rise to difficulties or suboptimal quality of the heat treatment.

US-2009/0272464-A1 relates to grain-oriented electrical sheet and discusses laser firing to introduce residual stress for magnetic domain control.

US-2003/0132208-A1 discusses laser micromachining employing a fast steering mirror to move a laser spot having a focused spot size in a desired pattern on a substrate to remove a target area that is larger than the focused spot size on the substrate.

BRIEF SUMMARY

A first aspect of the invention relates to a method for heat treatment of an object of sheet metal, comprising the step of heating at least one selected portion of the object using an energy beam;

wherein the beam is projected onto a surface of the object so as to produce a primary spot on the object, the beam being repetitively scanned in two dimensions in accordance with a first scanning pattern so as to establish an effective spot on the object, said effective spot having a two-dimensional energy distribution, and wherein said effective spot is displaced in relation to the surface of the object to progressively heat said at least one selected portion of the object. That is, at a given moment, the effective spot generated by the two-dimensional scanning of the primary spot heats part of said selected portion, and the effective spot is displaced over the surface of the object until the selected portion has been heated as desired.

The sheet metal object can be any kind of sheet metal object, including a portion of sheet metal coming from a roll, a plate of sheet metal, a sheet metal blank intended to be shaped into specific sheet metal object or workpiece at a later stage, a sheet metal component already shaped in, for example, a press or tool, using for example cold stamping/forming or hot stamping/forming, a component comprising one or more sheet metal portions and optionally other elements, interconnected by, for example, welding, screws, bolts, or other means, etc.

In many embodiments of the invention the energy beam is a beam of electromagnetic radiation, for example, a laser beam. The effective spot can be created and adapted using, for example, any of the techniques described in WO-2014/037281-A2, which is incorporated herein by reference. Whereas the description of WO-2014/037281-A2 is primarily focused on the laser hardening of journals of crankshafts and to a substantial extent focuses on the specific problem of avoiding overheating of the areas adjacent to the oil lubrication holes, it has been found that the principles disclosed therein regarding the scanning of the laser beam can be applied also to the heat treatment of sheet metal, including tasks such as the selective reduction of the hardness—for example, by tempering—of portions of previously hardened workpieces. Although traditionally it has been considered that the use of conventional means of heat treatment, such as the simple scanning of an energy beam once over the portion of the surface to be heated, is sufficient when it comes to heat treatments such as localized hardening and/or tempering of sheet metal, if has been found that the present invention provides for improvements in terms of flexibility, control and speed.

The displacement of the effective spot in relation to the surface of the sheet metal object can be carried out in accordance with a second scanning pattern. That is, the real/primary spot, that is, the spot that is produced by the beam at any given moment, is scanned in accordance with a first scanning pattern to create the effective spot, and this effective spot can be displaced in accordance with the second scanning pattern. Thus, two types of movement are combined or overlaid: the movement of the primary spot in accordance with the first scanning pattern, and the movement of the effective spot in accordance with the second scanning pattern, which in some embodiments of the invention can be a simple straight line.

The term "two-dimensional energy distribution" refers to the manner in which the energy applied by the energy beam is distributed over the effective spot, for example, during one sweep of the beam along the first scanning pattern. When the effective spot is projected onto a non-planar portion or area, such as a curved portion or area such as a portion or area featuring bends, the term "two-dimensional energy distribution" refers to how the energy is distributed along and across the surface of the object, that is, to the energy distribution along and across the effective spot as projected onto the surface of the object.

The present invention allows for a relatively rapid heating of a substantial area of the surface of the sheet metal object, due to the fact that the effective spot can have a substantial size, such as, for example, more than 4, 10, 15, 20 or 25 times the size (area) of the primary spot. Thus, heating a certain region or area of the sheet metal object to a desired extent in terms of temperature and duration can be accomplished more rapidly than if the heating is carried out by simply displacing the primary spot over the entire area, for example, following a sinusoidal or meandering pattern, or a straight line. The use of an effective spot having a relatively large area allows for high productivity while still allowing the relevant portion or portions of the surface to be heated for a relatively substantial amount of time, thereby allowing for, for example, less aggressive heating without compromising productivity.

The primary spot can have an area substantially smaller than the one of the effective spot. For example, in some embodiments of the invention, the primary spot has a size of less than 4 mm$^2$, such as less than 3 mm$^2$, at least during part of the process. The size of the primary spot can be modified during the process, so as to optimize the way in which each specific portion of the object is being heat treated, in terms of quality and productivity.

On the other hand, the use of an effective spot created by scanning the primary spot repetitively in two dimensions in accordance with a first scanning pattern, makes it possible to establish an effective spot having a selected two-dimensional energy distribution, which is substantially independent of the specific optics (lenses, mirrors, etc.) being used, and which can be tailored and adapted to provide for an enhanced or optimized heating of the sheet metal, from different points of view, including the speed with which the heat treatment is completed (for example, in terms of cm$^2$ per minute or in terms of terminated units per hour), and quality. For example, the heat can be distributed so that a leading portion of the effective spot has a higher energy density than a trailing portion, thereby increasing the speed with which a desired temperature of the surface is reached, whereas the trailing portion can serve to maintain the heating for a sufficient time to reach a desired depth and/or quality, thereby optimizing the velocity with which the effective spot can be displaced in relation to the surface of the object, without renouncing on the quality of the heat treatment. Also, the two-dimensional energy distribution can be adapted in relation to the sides of the effective spot, depending on the characteristics of the object, for example, so as to apply less heat in areas adjacent to an edge of the object or an opening in the object, where cooling due to heat transfer is slower, or so as to apply less heat in areas already featuring a relatively high temperature, for example, due to heating that has taken place recently. Also, the effective spot can be adapted in accordance to the tri-dimensional shape of the object, for example, to adapt the heating to the curvature, width, etc., of the object in the area being heated, and to the configuration of the portion of the object that is to be heated. The shape of the effective spot and/or the two-dimensional energy distribution can be adapted whenever needed, thereby adapting the process to the specific part of the object that is to be heated at any given moment. In some embodiments of the invention, the two-dimensional energy distribution can be varied as a function of the respective irradiation site on the object, taking into account, for example, the heat removal capability of a surrounding region. In some embodiments of the invention, the two-dimensional energy distribution can be varied taking into account desired characteristics of the product in different regions of the product, such as different requirements on hardness, rigidity, softness, ductility, etc.

Additionally, using the effective spot, created by the scanning of the primary spot in two dimensions, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the scanning of the primary spot and, thereby, the two-dimensional energy distribution of the effective spot.

The expression "first scanning pattern" does not imply that the primary spot must always follow one and the same scanning pattern when creating the effective spot, but is merely intended to distinguish the scanning pattern of the primary spot that is used to create the effective spot, from the pattern with which the effective spot is displaced or scanned in relation to the object being subjected to the heat treatment; the scanning pattern followed by the effective spot is sometimes referred to as a second scanning pattern.

In many embodiments of the invention, the velocity or mean or average velocity with which the primary spot is displaced in accordance with the first scanning pattern is substantially higher than the velocity with which the effective spot is displaced in relation to the surface of the object. A high velocity of the primary spot along the first scanning pattern reduces the temperature fluctuations within the effective spot during each sweep of the primary spot along the first scanning pattern.

In known prior art systems related to the heat treatment of sheet metal, the area being heated at each moment substantially corresponded to the primary spot projected by the beam onto the surface. That is, in prior art arrangements, the area being heated at each moment has a size that substantially corresponds to the one of the primary spot, and the width of the track being heated substantially corresponds to the width of the primary spot in the direction perpendicular to the direction in which the primary spot is being displaced, which in turn is determined by the laser and the optics used.

Of course, the present invention does not exclude the possibility of carrying out part of the heat treatment operating with the primary spot in a conventional way. For example, the primary spot can be displaced to carry out the heating in correspondence with the outline or contour of a region to be heated, or to carry out heating of certain details of the object being heated, whereas the effective spot described above can be used to carry out the heating of other parts or regions of the surface, such as the interior or main portion of a region to be heated. The skilled person will chose the extent to which the effective spot rather than the primary spot will be used to carry out the heating, depending on issues such as productivity and the need to carefully tailor the outline of a region to be heated or a certain portion of an object being subjected to heat treatment. For example, it is possible to use the primary spot to outline a region to be heated, while the effective spot is used to heat the surface within the outlined region. In some embodiments of the invention, during the process, the first scanning pattern can be modified to reduce the size of the effective spot until it ends up corresponding to the primary spot, and vice-versa.

That is, it is not necessary to use the effective spot to carry out all of the heating that has to take place during the heat treatment of the object. However, at least part of the heat treatment is carried out using the effective spot described above. For example, it can be preferred that during at least 50%, 70%, 80% or 90% of the time during which the beam is applied to the sheet metal object, it is applied so as to establish the effective spot as explained above, that is, by repetitively scanning the primary spot in accordance with the first scanning pattern.

In some embodiments of the invention, the two-dimensional energy distribution of the effective spot is dynamically adapted during displacement of the effective spot in relation to the surface of the object. Thereby, adaptation of the effective spot to the area or region of the object currently being heated can be accomplished. The expression dynamic adaptation is intended to denote the fact that adaptation can take place dynamically during displacement of the effective spot. Different means can be used to achieve this kind of dynamic adaptation, some of which are mentioned below. For example, in some embodiments of the invention, the scanning system can be operated to achieve the dynamic adaptation (for example, by adapting the operation of galvanic mirrors or other scanning means, so as to modify the first scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective spot, and/or the actual shape of the effective laser spot, and thus the shape of the area being heated at any given moment (disregarding the fact that the primary spot is moving, and just considering the effective spot). For example, the length and/or the width of the effective spot can be adapted dynamically during the process.

In some embodiments of the invention, adaptation of the two-dimensional energy distribution of the effective spot is carried out by adapting the power of the beam, such as by selectively turning the beam on and off. This includes interruption of the beam at its source, as well as other options such as interruption of the beam by interference with the path of the beam, for example with a shutter, and combinations thereof. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern. For example, a pixelized approach can be adopted, according to which the two-dimensional energy distribution is determined by the on/off state of the laser during the different portions or segments of the first scanning pattern.

In some embodiments of the invention, adaptation of the two-dimensional energy distribution of the effective spot is carried out by adapting the first scanning pattern.

In some embodiments of the invention, adaptation of the two-dimensional energy distribution of the effective spot is carried out by adapting the velocity with which the primary spot moves along at least a portion of the first scanning pattern.

That is, the two-dimensional energy distribution can be adapted by adapting, for example, the power of the beam—for example, by switching between different power states such as between on and off—, and/or by adapting the scanning pattern—for example, adding or leaving out segments, or modifying the orientation of segments, or completely changing a pattern for another one—, and/or by adapting the velocity with which the beam moves along the scanning pattern, such as along one or more segments thereof. The choice between different means for adapting the two-dimensional energy distribution can be made based on circumstances such as the capacity of the equipment to rapidly change between power states of the beam, and on the capacity of the scanner to modify the pattern to be followed and/or the speed with which the primary spot moves along the scanning pattern.

In some embodiments of the invention, focus of the beam is dynamically adapted during displacement of the primary spot along the first scanning pattern and/or during displacement of the effective spot in relation to the object being produced. For example, when a laser beam is used, the laser focus along the optical axis can be dynamically modified during the process, for example, so as to vary or maintain the size of the primary laser spot while it is being displaced along the first scanning pattern, and/or while the effective laser spot is being displaced in relation to the surface of the object. For example, the optical focus can be adapted to keep the size of the primary spot constant while the primary spot is moving over the surface of the object (for example, to compensate for varying distances between the laser source or the scanner and the position of the primary laser spot on the surface of the object).

In some embodiments of the invention, the size of the primary spot is dynamically adapted during displacement of the primary spot along the first scanning pattern and/or during displacement of the effective spot in relation to the surface of the object, so as to modify the two-dimensional energy distribution and/or the size of the effective spot.

In some embodiments of the invention, during at least one stage of the method, the effective spot comprises a leading portion having a higher energy density than a trailing portion of the effective spot (this arrangement can be preferred when it is desired to rapidly reach a certain temperature, and thereafter provide sufficient energy input to, for example, keep the material at the required temperature for a certain amount of time), or the effective spot comprises a leading portion having a lower energy density than a trailing portion of the effective spot (this arrangement can be preferred when it is desired to first pre-heat the material for some time, prior to making it reach a certain temperature). In some embodiments of the invention, the effective spot comprises an intermediate portion having a higher energy density than a leading portion and a trailing portion of the effective spot. In some embodiments of the invention, the effective spot features a substantially uniform energy distribution, with a substantially constant energy density throughout the effective spot.

As indicated above, the two-dimensional energy distribution can be adapted dynamically while the method is being carried out, for example, so that it is different in relation to different portions of the surface of the object.

In some embodiments of the invention, the mean or average velocity of the primary spot along the first scanning pattern is substantially higher than the mean or average velocity with which the effective spot is displaced in relation to the surface of the object. For example, the average velocity of the primary spot along the first scanning pattern can preferably be at least ten times higher, more preferably at least 100 times higher, than the average velocity with which the effective spot is displaced in relation to the object. A high velocity of the primary spot reduces the temperature fluctuations within the effective spot during one sweep of the primary spot along the first scanning pattern.

In some embodiments of the invention, the beam is scanned in accordance with said first scanning pattern so that said first scanning pattern is repeated by the beam with a frequency of more than 10, 25, 50, 75, 100, 150, 200 or 300 Hz (i.e., repetitions of the scanning pattern per second). A high repetition rate can be appropriate to reduce or prevent non-desired temperature fluctuations in the areas being heated by the effective spot, between each scanning cycle, that is, between each sweep of the beam along the first scanning pattern. In some embodiments of the invention, the first scanning pattern remains constant, and in other embodiments of the invention, the first scanning pattern is modified between some or all of the sweeps of the beam along the first scanning pattern.

In some embodiments of the invention, the size (that is, the area) of the effective spot, such as the average size of the effective spot during the process or the size of the effective spot during at least one moment of the process, such as the maximum size of the effective spot during the process, is more than 4, 10, 15, 20 or 25 times the size of the primary spot. For example, in some embodiments of the invention, a primary spot having a size in the order of 3 mm$^2$ can be used to create an effective spot having a size of more than 10 mm$^2$, such as more than 50 or 100 mm$^2$ or more. The size of the effective spot can be dynamically modified during the process, but a large average size can often be preferred to enhance productivity, and a large maximum size can be useful to enhance productivity during at least part of the process.

The method can be carried out under the control of electronic control means, such as a computer.

In some embodiments of the invention, the first scanning pattern is a polygonal scanning pattern comprising a plurality of lines. For example, the first scanning pattern can be a polygon such as a triangle, a square or a rectangle, a pentagon, a hexagon, a heptagon, an octagon, etc. The polygon does not need to be a perfect polygon, for example, the lines making up the polygon can in some embodiments be more or less curved and the edges of the polygon where the lines meet can be rounded, etc.

In some embodiments of the invention the first scanning pattern comprises a plurality of lines, such as a plurality of straight or curved lines, which in some embodiments of the invention are arranged substantially parallel with each other. In some embodiments of the invention, there are two, three, four or more of these lines.

In some embodiments of the invention, the first scanning pattern comprises at least three segments, and said scanning of the energy beam is carried out so that said beam or spot follows at least one of said segments more frequently than it follows at least another one of said segments. This arrangement is advantageous in that it enhances flexibility and the way in which the scanning pattern can be used to provide an adequate and, whenever desired, symmetric or substantially symmetric energy distribution. For example, one of said segments can be used as a path or bridge followed by the beam when moving between two other segments, so that the transfer of the spot projected by the beam between different portions (such as an end and a beginning) of the first scanning pattern can be carried out using segments (such as intermediate segments) of the scanning pattern for the transfer, whereby the transfer can often be carried out without turning off the beam and without distorting the symmetry of the two-dimensional energy distribution, when such symmetry is desired.

In some embodiments of the invention, the first scanning pattern comprises at least three substantially parallel straight or curved lines distributed one after the other in a first direction, said lines generally extending in a second direction, wherein said at least three lines comprise a first line, at least one intermediate line, and a last line arranged one after the each other in said first direction, wherein said scanning of the beam is carried out so that said beam or spot follows said intermediate line more frequently than said beam follows said first line and/or said last line. That is, for example, the beam can on an average follow said intermediate line twice as often as it follows said first line and said last line, for example, the beam can travel along the intermediate line each time it moves from the first line towards the last line, and vice-versa. That is, the intermediate line or lines can serve as a kind of bridge followed by the projected spot when moving between the first and the last line.

This arrangement has been found to be practical and easy to implement, and it has been found that adequate energy distributions can often be obtained by adapting scanning speed and without substantially adapting the power of the beam. It is also possible to modify the power of the beam during scanning so as to tailor the energy distribution, but rapid switching of the power is not always possible or desirable, and having the beam, such as a laser beam, at a low power level or switched off during substantial parts of the scanning cycle may imply a sub-optimal use of the capacity of the equipment, which can be a serious disadvantage when the equipment, such as a laser equipment, is used for heat treatment of sheet metal objects. Thus, it is often desirable to operate with the beam fully in the on state, to take full advantage of the available power.

It is often desirable to use three or more lines arranged in this way, that is, one after the other in a direction different from, such as perpendicular to, the direction along which the lines extend, in order to achieve a substantial extension of the effective spot not only in the direction along the lines, but also in the other direction, so as to make the effective spot adequate for heating a sufficiently wide area to a sufficiently high temperature and to maintain the temperature at the desired level or levels during sufficient time, while allowing the effective spot to travel with a relatively high speed, thereby allowing for a high productivity. Thus, a substantial extension of the effective spot in two dimensions is often an advantage.

In some embodiments of the invention, the first scanning pattern comprises at least three substantially parallel lines or segments, distributed one after the other in a first direction, such as in the direction along which the effective spot travels during the process, said lines extending in a second direction, such as in a direction perpendicular the first direction. In some embodiments of the invention, said at least three lines comprise a first line, at least one intermediate line, and a last line, arranged after each other in said first direction, and the scanning of the beam is carried out so that the projected spot is scanned along said lines according to a sequence in accordance with which the spot, after following said first line, follows said intermediate line, said last line, said intermediate line, and said first line, in that order.

The above definition does not mean that the scanning has to start with the first line, but just indicates the sequence according to which the beam tracks or follows the above-mentioned lines of the scanning pattern. Also, it does not exclude that in between (such as before or after) following some or all of the lines indicated above, the beam may follow other lines, such as lines interconnecting the first, last and intermediate lines, and/or additional intermediate lines.

That is, in these embodiments, after moving along the first line, the beam always follows said intermediate line twice before moving along the first line again. Whereas a more straight-forward approach might have been to carry out the scanning so that after said last line the beam and its projected spot return directly to said first line, it has been found that the sequence followed according to these embodiments of the invention is suitable to achieve a symmetric energy distribution about an axis of symmetry extending in said first direction.

In some embodiments of the invention, the scanning pattern comprises a plurality of said intermediate lines. The number of lines can be chosen by the operator or process designer or equipment designer depending on, for example, the size of the primary spot projected by the beam and the desired extension of the effective spot, for example, in the first direction. For example, a minimum number of lines can in some embodiments be three lines, but in many practical implementations a larger number of lines can be used, such as four, five, six, ten or more lines, when counting the first, the last and the intermediate lines. In some embodiments of the invention, the number of lines is modified to modify the energy distribution, while the effective spot is travelling along the surface area where heating of the sheet metal material is to take place.

In some embodiments of the invention, the primary spot is displaced with a higher velocity along said at least one intermediate line than along said first line and last line. This is often preferred in order to achieve an adequate energy distribution in said first direction, at least during a portion or a substantial portion of the process. The higher velocity of the beam when moving along the intermediate lines, or at least when moving along one or some of them, compensates for the fact that the beam moves along said intermediate lines twice as often as it moves along the first and last lines. For example, the velocity of the primary spot along the intermediate lines can in some embodiments of the invention be about twice the velocity of the primary spot along the first and/or last lines. The velocity can be different for different intermediate lines. The velocity for each line can be chosen in accordance with a desired energy distribution in the first direction. Now, the velocity with which the effective spot is displaced along different lines or segments of the scanning pattern can be dynamically modified while the effective spot is travelling along the area where heating of the sheet metal material is to take place, for example, to adapt the energy distribution to optimize the way in which the process is taking place, for example, in order to increase the quality of the product, for example, of the hardening and/or tempering.

In some embodiments of the invention, the scanning pattern further comprises lines extending in said first direction, between the ends of the first, last and intermediate lines, whereby the primary spot follows said lines extending is said first direction when moving between said first line, said intermediate lines and said last line. In some embodiments of the invention, the primary spot is displaced with a higher velocity along said lines extending in the first direction, than along said first line and said last line, at least during part of the process.

In some embodiments of the invention, the beam is displaced along said first scanning pattern without switching the beam on and off and/or while maintaining the power of the beam substantially constant. This makes it possible to carry out the scanning at a high speed without taking into account the capacity of the equipment, such as a laser equipment, to switch between different power levels, such as between on and off, and it makes it possible to use equipment that may not allow for very rapid switching between power levels. Also, it provides for efficient use of the available output power, that is, of the capacity of the equipment in terms of power.

In some embodiments of the invention, the energy beam is a laser beam. A laser beam is often preferred due to issues such as cost, reliability, and availability of appropriate scanning systems. In some embodiments of the invention, the power of the laser beam is higher than 1 kW, such as higher than 3 kW, higher than 4 kW, higher than 5 kW or higher than 6 kW, at least during part of the process. Traditionally, when a primary laser spot is scanned to progressively heat the region to be heat treated, lasers having relatively low output powers have often been used. For example, in EP-1308525-A2 discussed above, a beam power of 600 W is suggested. This is because in this prior art reference, the laser spot that at a certain moment is heating a surface portion corresponds to the primary spot, having a relatively small surface area. Thus, a lower power output can be preferred to avoid overheating. In accordance with the invention, the power of the laser can be distributed over an effective laser spot having a surface area substantially larger than the one of the primary laser spot. That is, with the present approach, based on the creation of a larger effective laser spot, higher powers can be used, whereby the productivity can be enhanced.

In some embodiments of the invention, the first scanning pattern can be implemented in line with the teachings of WO-2014/037281-A2, for example, in line with the teachings in relation to FIGS. 9-11 thereof.

In some embodiments of the invention, the object is a vehicle body component, such as a structural component, for example, a pillar such as a so-called B-pillar or central pillar. The method described above is useful to facilitate the optimization of the heating of selected portions of vehicle components, for example, to harden certain regions or to temper certain regions. For example, one or more portions of a previously hardened object or region can be softened, that is, made less hard, using the method of the invention. The method makes it easy to tailor the way the heating takes place, so as to optimize it and adapt it to a specific product and to the desired characteristics of the product, without any need for complex optics. Basically, adaptation can be carried out by adapting software, especially software controlling a scanner for displacing the laser beam.

In some embodiments of the invention, the object is a previously at least partially hardened object, and the step of heating at least one selected portion of the object using an energy beam is carried out so as to reduce the hardness of at least a portion of the object, for example, by tempering said portion, which can be a previously hardened portion. For example, a sheet metal object such as structural vehicle component, such as a vehicle pillar, which can have been hot formed and hardened during the hot stamping or hot forming step (this is also known as "press hardening"), can be heat treated in accordance with the method of the invention, whereby the heating can be controlled by controlling the two-dimensional energy distribution of the effective laser spot, adapting it as desired to the layout of the surface and to the geometry of the portion to be heat treated. Thereby, high productivity and quality can be achieved without the need for complex optics, while the system is highly flexible and easily adaptable to new products or to changes in the products, such as to provide for a new distribution of the portions with reduced hardness. The heat treatment can serve to reduce the hardness in one or more areas of the object. For example, in the case of a vehicle component, areas with reduced hardness can be useful to assure that deformation will take place in a certain manner in the case of an impact, or to allow certain assembly operations to be carried out, or to facilitate cutting of the component after an accident, etc.

In some embodiments of the invention, the object is a structural vehicle component, and the step of heating at least one selected portion of the object using an energy beam is carried out so as to establish at least one preferred zone of deformation in the case of a crash. For example, a vehicle pillar component with high hardness can be treated in accordance with the invention in certain regions, whereby softer or more ductile portions are established, thereby substantially predetermining the manner in which deformation will take place in the case of a collision or when the vehicle is turned over and lands on its side or upside down.

In some embodiments of the invention, the two-dimensional energy distribution of the effective spot is dynamically adapted during displacement of the effective spot in relation to the surface of the object, in response to at least one change in angle between the energy beam and a portion of the surface of the object being heated by the effective spot, for example, adapting the two-dimensional energy distribution, including the shape and the size of the effective spot as well as the two-dimensional energy distribution within the effective spot, to the curvature and/or bends in the surface, and/or to variations in the angle at which the surface is oriented in relation to the scanner.

In some embodiments of the invention, at least one of the power of the energy beam, the first scanning pattern and the velocity with which the primary spot moves along at least a portion of the first scanning pattern, is/are adapted in response to at least one change in angle between the energy beam and a portion of the surface of the object being heated by the effective spot.

Thus, the teachings of the present invention can be used to adequately control the heating when the effective spot moves over a curved surface, over a bent portion of the object, or when the effective spot moves from a first portion or region of the object to another portion or region placed at an angle with the first portion or region, etc. This can be very useful in order to, for example, assure a good quality of the heating, when the object being heated is an object that has previously been shaped (for example, hot-formed) in for example a press, so that the surface features a more or less complex shape with curves and/or bends, etc. This is often the case with, for example, sheet metal vehicle components.

The present invention provides for enhanced flexibility and control of the heating process, due to the way in which the two-dimensional energy distribution of the effective laser spot can be adapted without any need for modifying or replacing the optics involved.

Another aspect of the invention relates to a system for heat treatment of a sheet metal object, the system comprising means for supporting an object of sheet metal, and means for producing an energy beam, such as a laser beam, and for projecting the energy beam onto a surface of the object. The system comprises a scanner for scanning the energy beam in at least two dimensions. The system is arranged, such as programmed, for carrying out the method described above. In some embodiments of the invention, the system includes means for producing a relative movement between the scanner and the object, by displacing the scanner and/or the object.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DETAILED DESCRIPTION

Figure 1A:
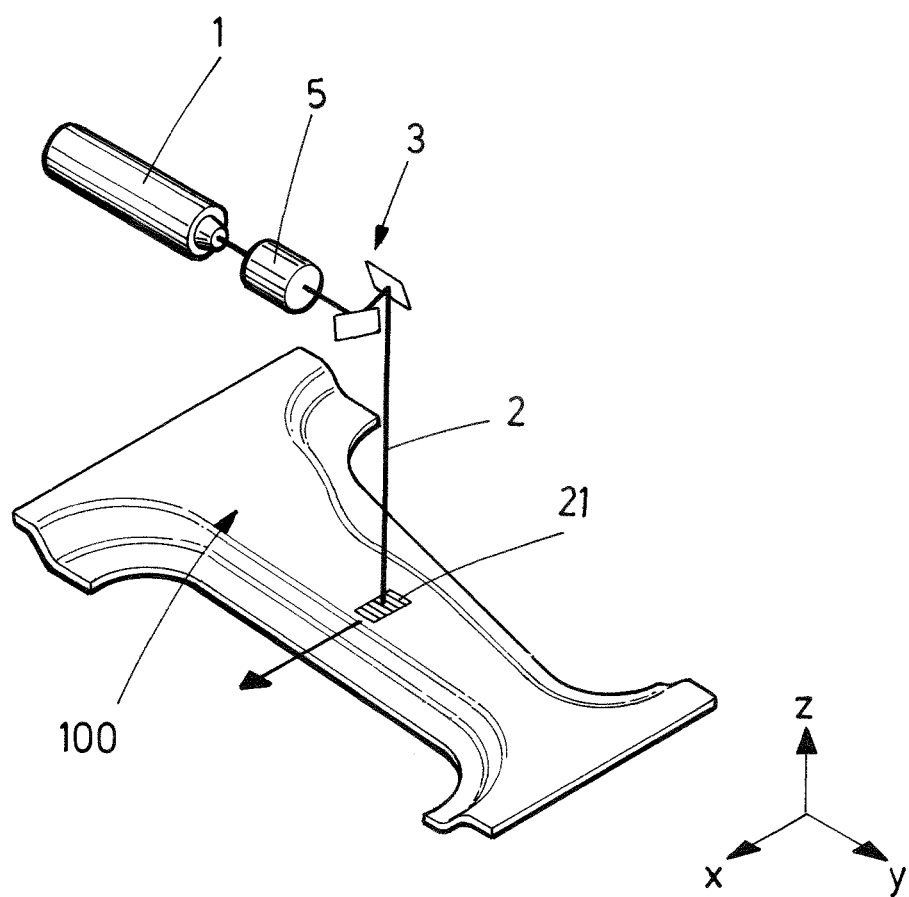
FIG. 1A is a schematic perspective view of a system in accordance with one possible embodiment of the invention.

FIG. 1A schematically illustrates a system in accordance with one possible embodiment of the invention, for heat treatment of a sheet metal object such as a pillar for a vehicle. The system comprises a laser equipment 1 for producing a laser beam 2, and a scanner 3 including two mirrors or similar for two-dimensional scanning of the laser beam 2 in the horizontal (X-Y) plane. The equipment for producing a laser beam can, in some embodiments of the invention, be an equipment suitable for producing laser beams having a relatively high power content, such as 1 kW or more. One example of a suitable device is the Ytterbium Laser System Model YLS-6000-CT, by IPG Photonics, with a nominal power of 6 kW.

The system further comprises means (not shown in FIG. 1A) for holding or supporting a workpiece 100; in the illustrated embodiment, the workpiece is for a vehicle body pillar, such as a so-called center pillar. The pillar or pillar workpiece can, for example, be a workpiece with very high hardness, obtained by hot-pressing a sheet metal template to give it the desired shape, followed by cooling the workpiece to produce quenching, as known in the art. The laser beam 2 is projected onto the workpiece in a region where it is desired to provide for reduced hardness, for example, to establish an area where deformation is preferably to take place in the case of an impact.

Traditionally, this was sometimes carried out by basically sweeping a laser beam, having a certain width, once over the area where reduced hardness was desired, typically corresponding to a strip or band across the pillar. However, in accordance with the present embodiment of the invention, the laser beam (and the primary laser spot that the beam projects on the building material) is repetitively scanned at a relatively high speed following a first scanning pattern (illustrated as a set of lines extending in parallel with the Y axis in FIG. 1A), thereby creating an effective laser spot 21, illustrated as a square in FIG. 1A. This is achieved using the scanner 3. This effective laser spot 21 is displaced according to a second scanning pattern, for example, across the pillar; in FIG. 1A, an arrow indicates how the effective laser spot 21 can, for example, be displaced in parallel with the X axis of the system.

The displacement of the effective laser spot 21 according to the second scanning pattern can likewise be achieved by the scanner 3, and/or due to displacement of the scanner or associated equipment, for example, along tracks (not shown in FIG. 1A), such as tracks extending in parallel with the X axis and/or the Y axis. It can also be achieved by displacing the workpiece 100 in relation to the position of the scanner.

The effective laser spot and its two-dimensional energy distribution can be dynamically adapted during the displacement of the effective laser spot along the second scanning pattern. For example, considering FIG. 1A, the width of the effective laser spot (along the Y axis) can be adapted during its displacement across the workpiece, so that the width of the track subjected to heat treatment varies across the workpiece. Also other features of the effective laser spot can be adapted, so as to optimize the heat treatment, for example, the establishment of an area where the hardness is reduced so as to provide for a desired performance of the workpiece (for example, in the case of a structural component for a vehicle, so as to provide for a desired performance in terms of bending following an impact).

Figure 1B:
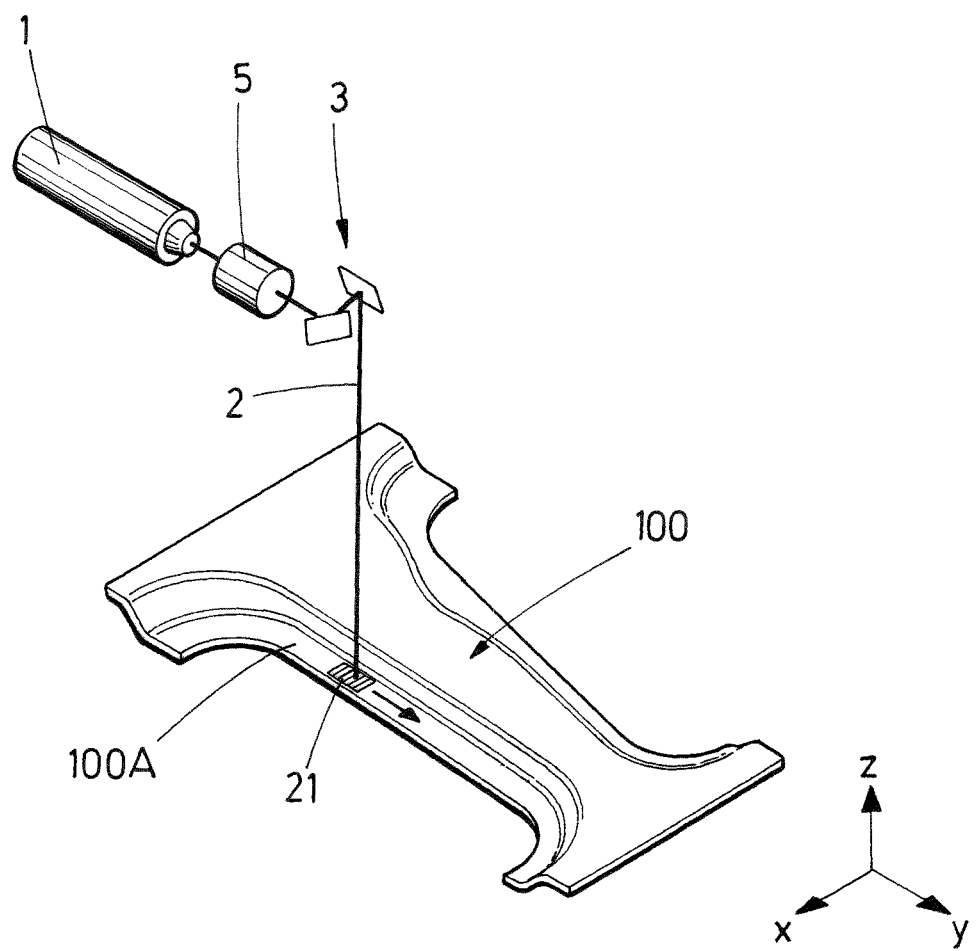
FIGS. 1B-1E schematically illustrate the system of FIG. 1A during heat treatment of different portions of a workpiece.
Figure 1C:
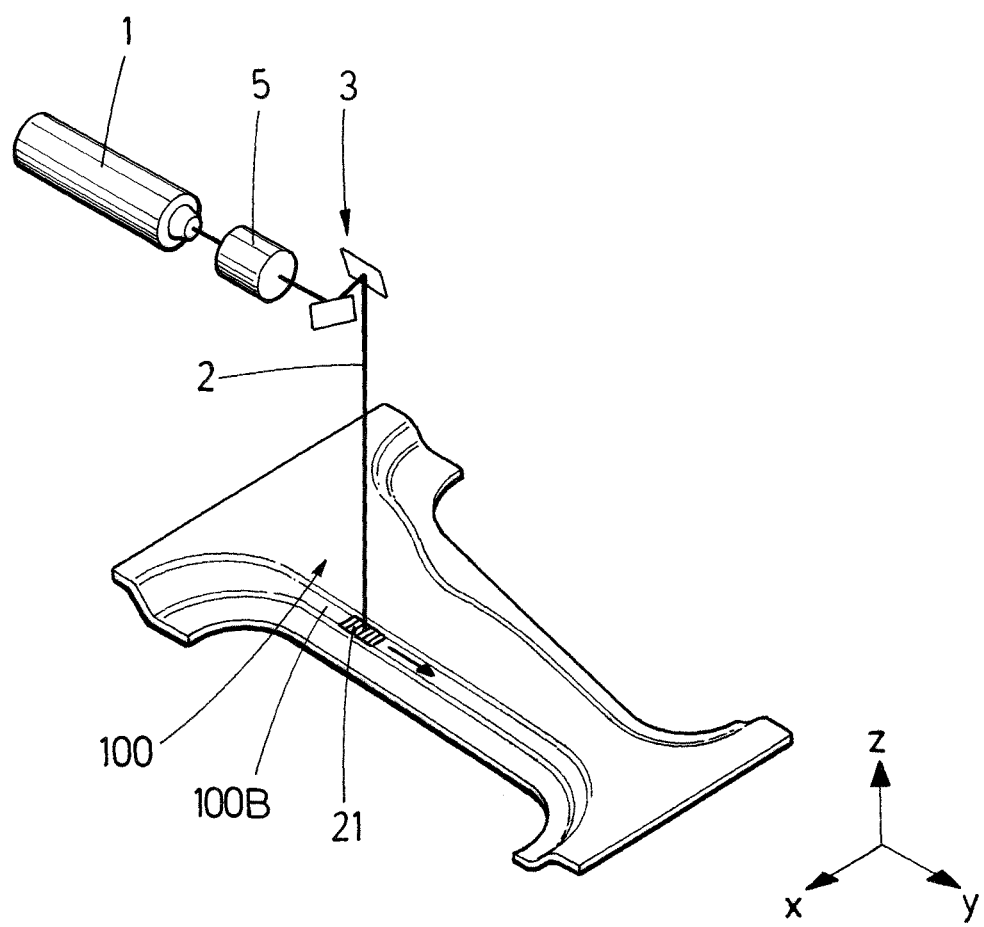
Figure 1D:
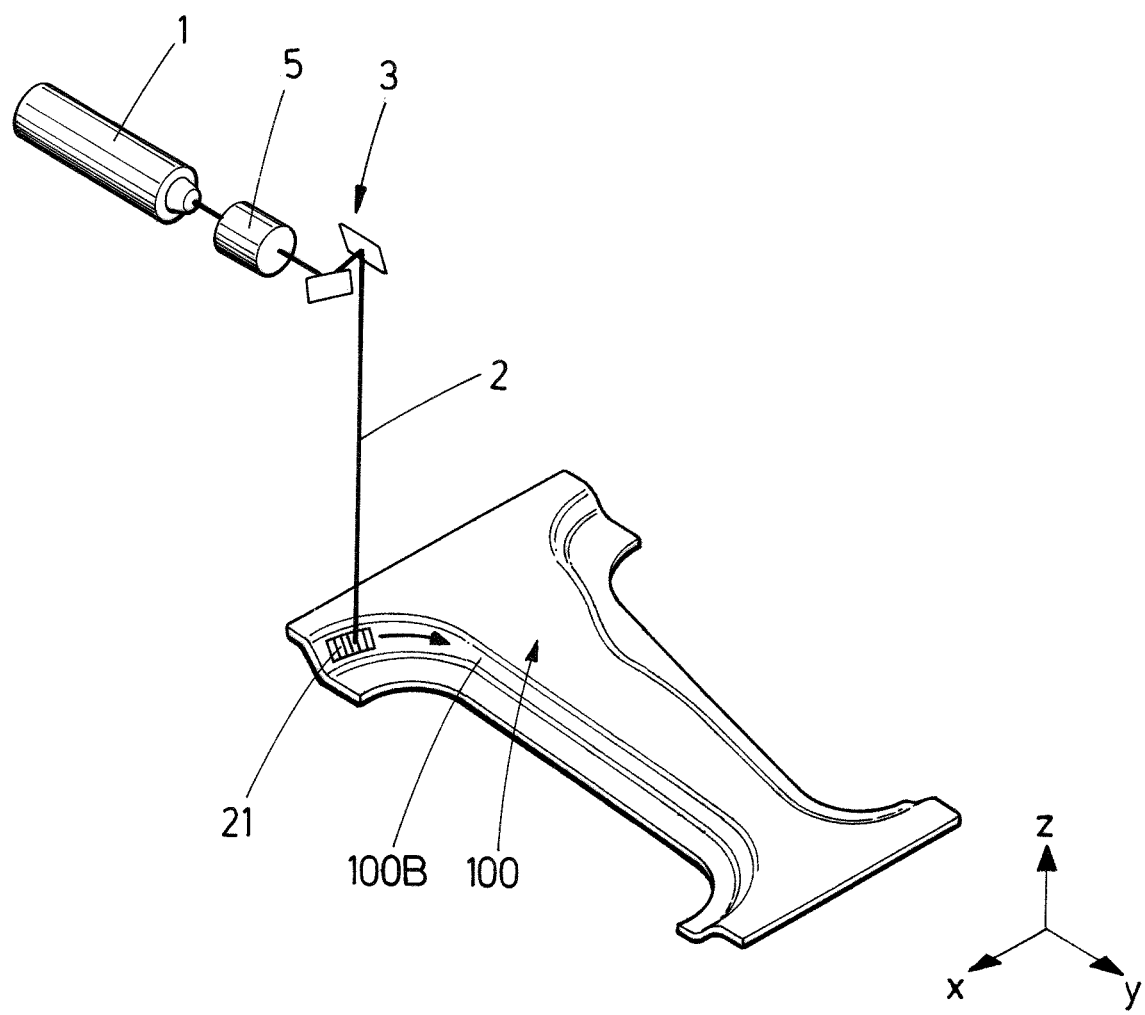

FIGS. 1B and 1C schematically illustrate how the effective laser spot 21 can be adapted in width so as to carry out heat treatment of two tracks or segments 100A and 100B, respectively, of the workpiece 100, these two tracks or segments having different widths and extending at two substantially different angles with regard to the laser source (the scanner). FIG. 1D schematically illustrates how the effective laser spot can be displaced along a segment 100B of the workpiece having a width that varies along the track, whereby for example the width of the effective laser spot in the direction perpendicular to its displacement along the segment can be dynamically adapted during this displacement.

Figure 1E:
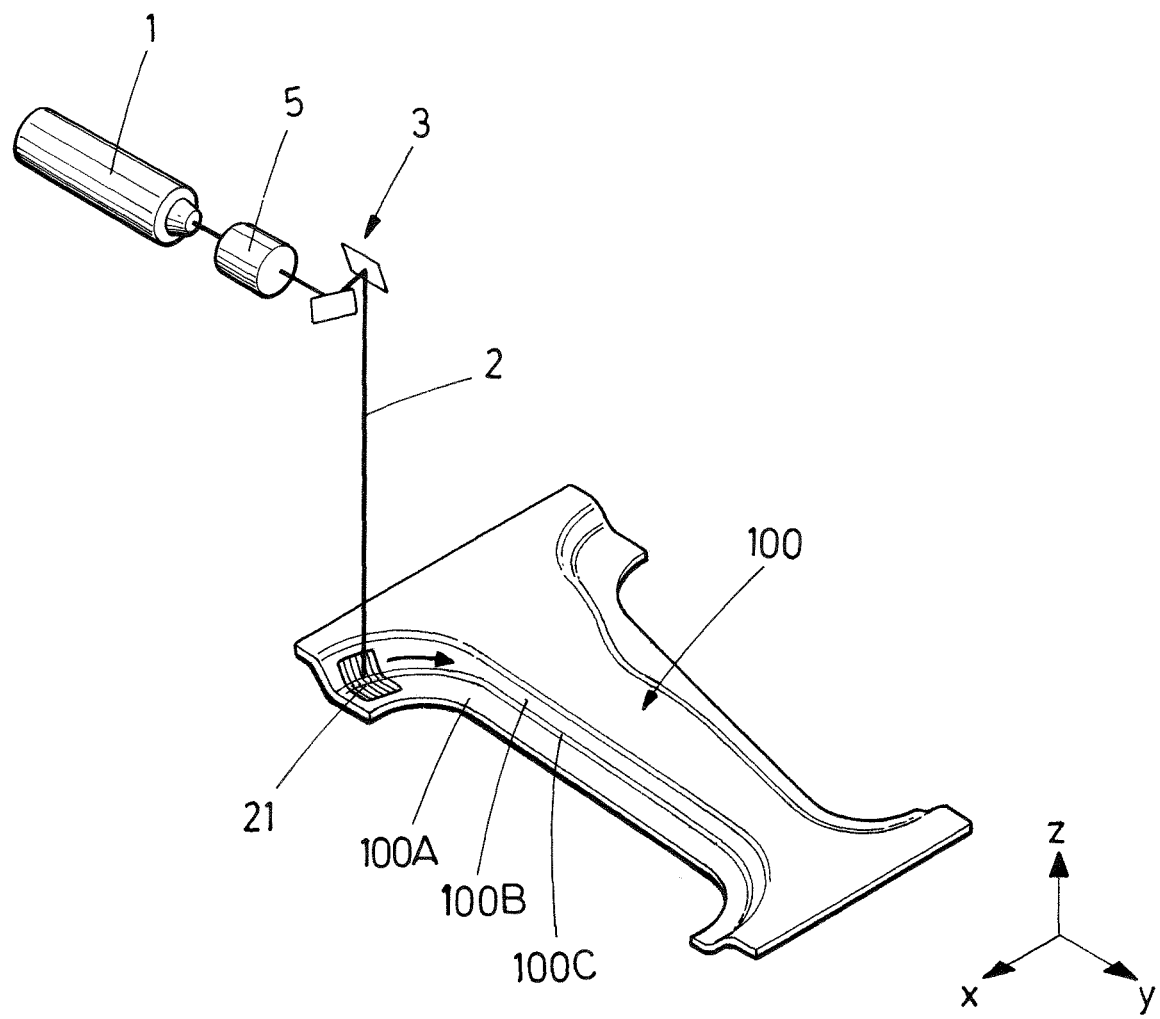

Due to the flexibility with which the two-dimensional energy distribution within the effective laser spot as well as the shape and dimensions of the effective laser spot can be adapted, it is relatively easy to adapt the two-dimensional energy distribution also to complex surfaces, such as those of a sheet metal workpiece that has been shaped in a press so as to have a pre-determined three-dimensional configuration. For example, FIG. 1E illustrates how the effective laser spot can be applied to provide for heat treatment of a track comprising two portions 100A and 100B of a pillar for a vehicle, in which said two portions are arranged at different angles in relation to the laser source and separated by a bend 100C. The shape of the effective laser spot and the two-dimensional energy distribution within the effective laser spot—that is, the energy distribution along and across the effective spot as projected onto the surface of the object—can be adapted to, for example, the width of the area to be heated, the three-dimensional shape of said area to be heated (so as to, for example, take the bend 100C into account), the orientation of different portions of said area in relation to the laser beam, etc.

In some embodiments of the invention, the system can include means 5 for dynamically adapting the size of the primary spot (for example, so as to modify the two-dimensional energy distribution and/or the size of the effective laser spot 21) and/or the focus of the laser beam along the optical axis. This makes it possible to control (such as to vary or maintain) the size of the primary laser spot while it is being displaced along the first scanning pattern, and/or while the effective laser spot 21 is being displaced in relation to the surface of the object. For example, the optical focus can be adapted to keep the size of the primary spot constant while the primary spot is moving over the surface of the object (for example, to compensate for varying distances between the scanner and the position of the primary laser spot on the object being produced). For example, means for dynamically adapting the focus of the laser beam can in some embodiments of the invention comprise a varioSCAN® focusing unit, obtainable from SCANLAB AG (www.scanlab.de).

Figure 2:
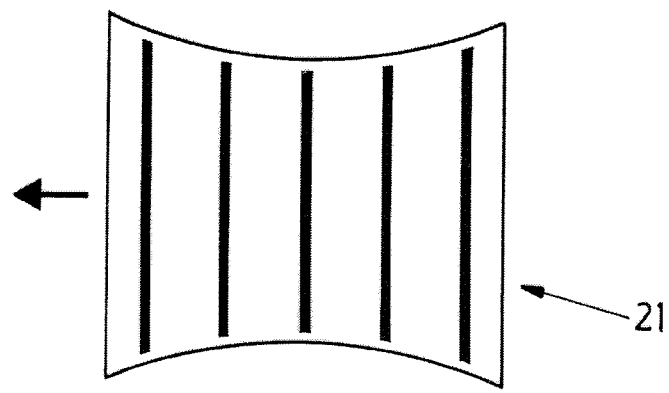
FIG. 2 schematically illustrates an effective laser spot created by a scanning pattern comprising a plurality of parallel lines.

It has been found that it can often be practical to provide a scanning pattern comprising more than two lines arranged after each other in the direction of travelling of the effective laser spot (that is, the direction of the relative movement between the effective laser spot and the surface of the object), such as schematically illustrated in FIG. 2, where the effective laser spot 21 is created by a plurality of parallel lines, extending in a direction perpendicular to the direction in which the effective laser spot is being displaced in relation to the surface of the object (this direction is indicated with an arrow in FIG. 2). The lines can have the same or different lengths, and the space between subsequent lines is one of the parameters that can be used to control the two-dimensional energy distribution.

Such a scanning pattern can be created by repetitively scanning the primary laser spot in the direction perpendicular to the direction in which the effective laser spot is travelling, displacing the laser beam a small distance between each scanning step, so as to trace two, three or more parallel lines. Once the primary laser spot has completed the scanning pattern, it will return to its original position and carry out the scanning pattern once again. The frequency with which this occurs is preferably high, so as to avoid undesired temperature fluctuations within the effective laser spot 21.

The laser beam can be switched off while it is being displaced towards a new line to be followed, and/or between finishing the last line of the scanning pattern and returning to the first line of the scanning pattern. However, switching laser beams on and off requires time, and can slow down the scanning frequency. Also, the time during which the laser beam is switched off is time that is lost in terms of efficient use of the laser for heating.

Figure 3A:
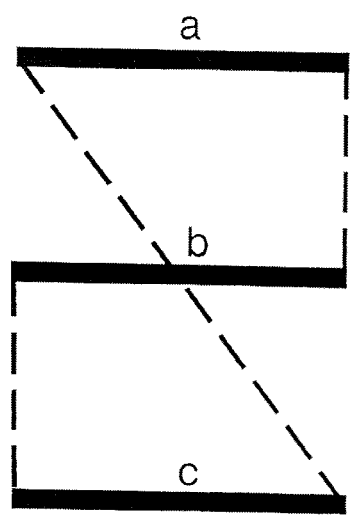
FIGS. 3A and 3B illustrate one possible scanning pattern comprising a plurality of parallel lines.
Figure 3B:
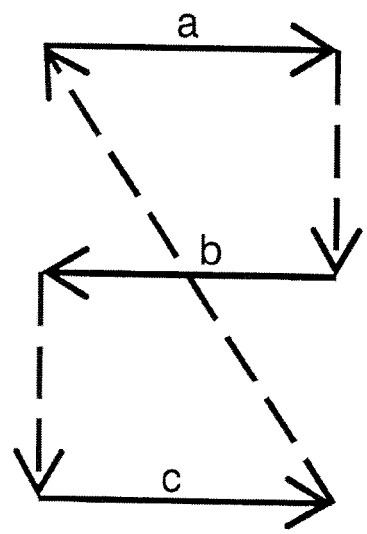

FIGS. 3A and 3B illustrate one possible scanning pattern comprising three main lines a-c (illustrated as continuous lines) of the scanning pattern, and hatched lines illustrating the path which the laser spot follows between said lines. In FIG. 3B, the arrows schematically illustrate the way in which the primary laser spot travels over the surface.

Now, this scanning pattern involves a problem in that the heat distribution will not be symmetric. The same applies if, at the end of the pattern, when finishing the last line c (that is, from the head of the arrow of line c in FIG. 3B), the laser beam returns vertically to line a.

Figure 4A:
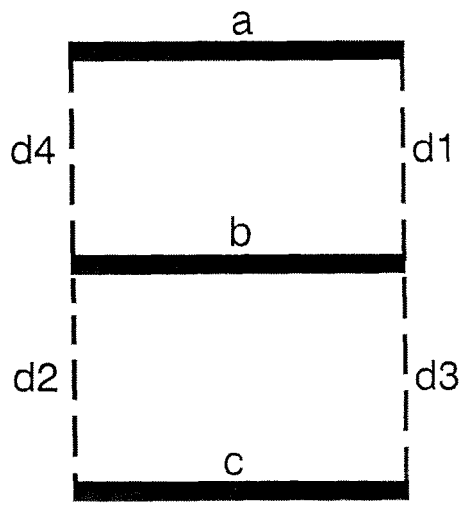
FIGS. 4A and 4B illustrate a scanning pattern for creating an effective laser spot in accordance with an embodiment of the invention.
Figure 4B:
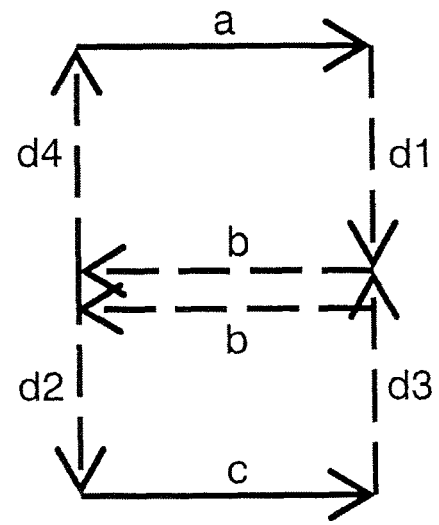

A more symmetrical energy distribution with regard to the axis parallel with the direction in which the effective laser spot is being displaced can be obtained with a scanning pattern as per FIGS. 4A and 4B, likewise comprising three parallel lines a-c interconnected by the lines d followed by the primary laser spot when moving between the three parallel lines. As illustrated in FIG. 4B, the laser beam, from the beginning of the first line a, travels as follows: a-d1-*b*-d2-*c*-d3-*b*-d4.

That is, the primary laser spot travels along the intermediate line b twice as often as it travels through the first line and the last line: it travels along the intermediate line b twice for each time it travels along the first line a and the last line c. Thereby, a completely symmetrical scanning pattern can be obtained, in relation to the axis parallel with the direction in which the effective laser spot is travelling.

The energy distribution along this axis can be set by adjusting, for example, the distance between the lines a-c and the speed with which the laser beam travels along the lines. By adjusting the speed and/or scanning pattern, the energy distribution can be dynamically adapted without turning the laser beam on and off or without substantially modifying the power of the laser beam. For example, if the energy is to be distributed substantially equally throughout the effective laser spot, the laser beam can travel with a higher speed along the intermediate line b than along the first line a and the last line c. For example, the velocity of the primary laser spot along line b can be twice the speed of the primary laser spot along lines a and c. In some embodiments of the invention, the velocity of the effective laser spot along lines d1-d4 can also be substantially higher than the velocity of the effective laser spot along lines a and c.

Thus, tailoring of the energy distribution can be achieved by adapting the distribution of the lines, such as the first, last and intermediate lines a-c, and by adapting the velocity of the primary laser spot along the different segments a-d (including d1-d4) of the scanning pattern. The distribution of the segments and the velocity of the primary laser spot along the segments can be dynamically modified while the effective laser spot is being displaced in relation to the surface of the sheet metal object being heated, so as to adapt the two-dimensional energy distribution. Also, the scanning pattern can be adapted by adding or deleting segments during the travelling of the effective laser spot.

Figure 5A:
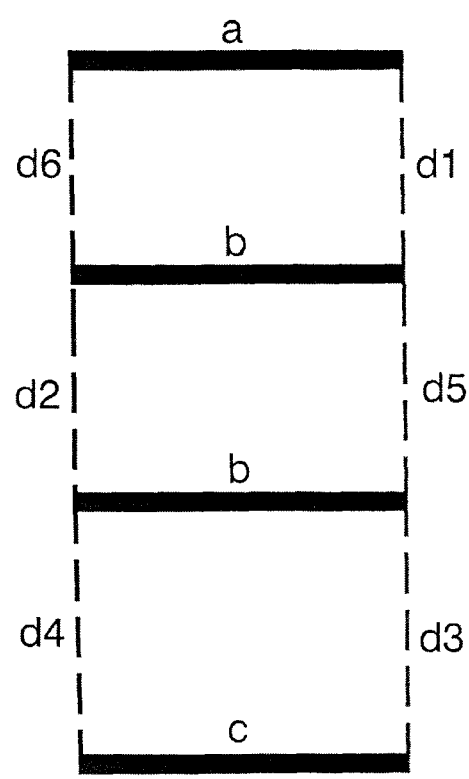
FIGS. 5A and 5B illustrate a scanning pattern for creating an effective laser spot in accordance with another embodiment of the invention.
Figure 5B:
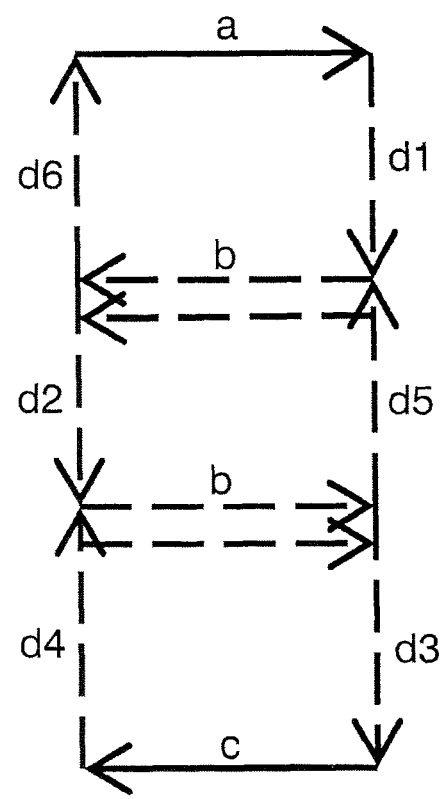

The same principle can be applied to other scanning patterns, such as the scanning pattern of FIGS. 5A and 5B, which includes an additional intermediate line b. Here, the path followed by the primary laser spots: a-d1-*b*-d2-*b*-d3-*c*-d4-*b*-d5-*b*-d6.

Figure 6A:
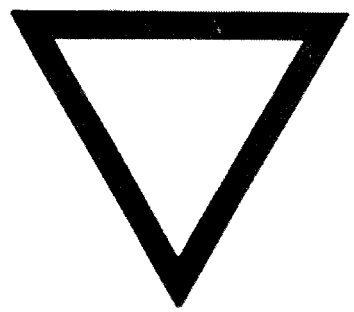
FIGS. 6A-6C illustrate scanning patterns according to other embodiments of the invention.
Figure 6B:
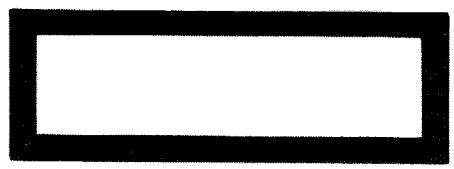
Figure 6C:

FIGS. 6A-6C illustrate some alternative scanning patterns. For example, the first scanning pattern can be a polygon such as a triangle (cf. FIG. 6A), a rectangle (cf. FIG. 6B), or an octagon (cf. FIG. 6C).

Figure 7:
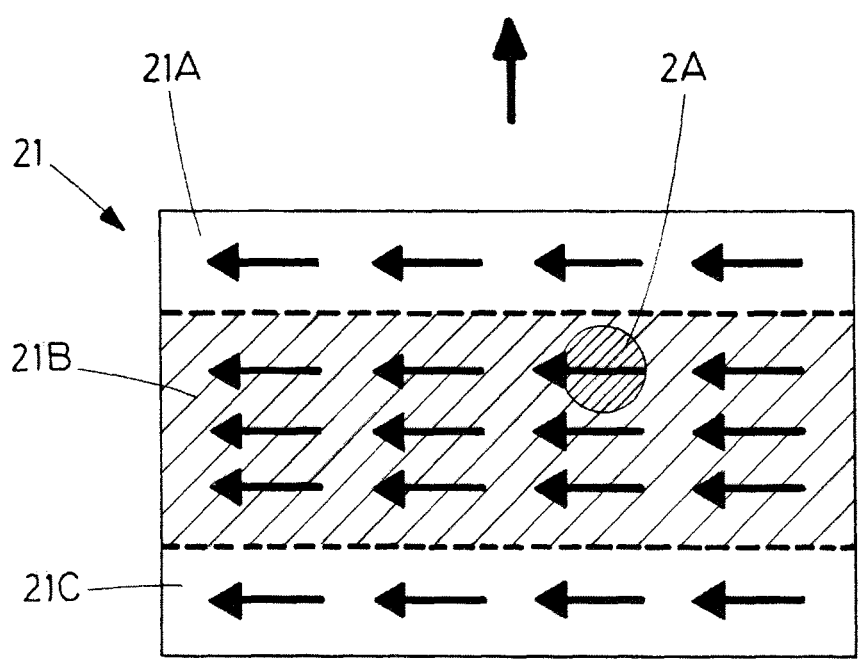
FIG. 7 schematically illustrates an effective spot in accordance with one possible embodiment of the invention.

FIG. 7 schematically illustrates an effective spot 21 in accordance with one possible embodiment of the invention. The effective spot has a substantially rectangular configuration, with a height and a width. The arrow at the top of the figure illustrates the direction in which the effective spot 21 is being displaced in relation to the surface of the object.

The effective spot 21 is obtained by scanning the primary spot 2A projected by the beam, following a scanning pattern comprising five parallel lines, indicated by the rows of arrows within the effective spot 21. In this embodiment, a leading portion 21A of the effective spot provides a certain pre-heating of the material, and a trailing portion 21C is provided to slow down the cooling process. The main heating of the material takes place in the central portion 21B of the effective spot 21, that is, between the leading portion 21A and the trailing portion 21C.

Figure 8:
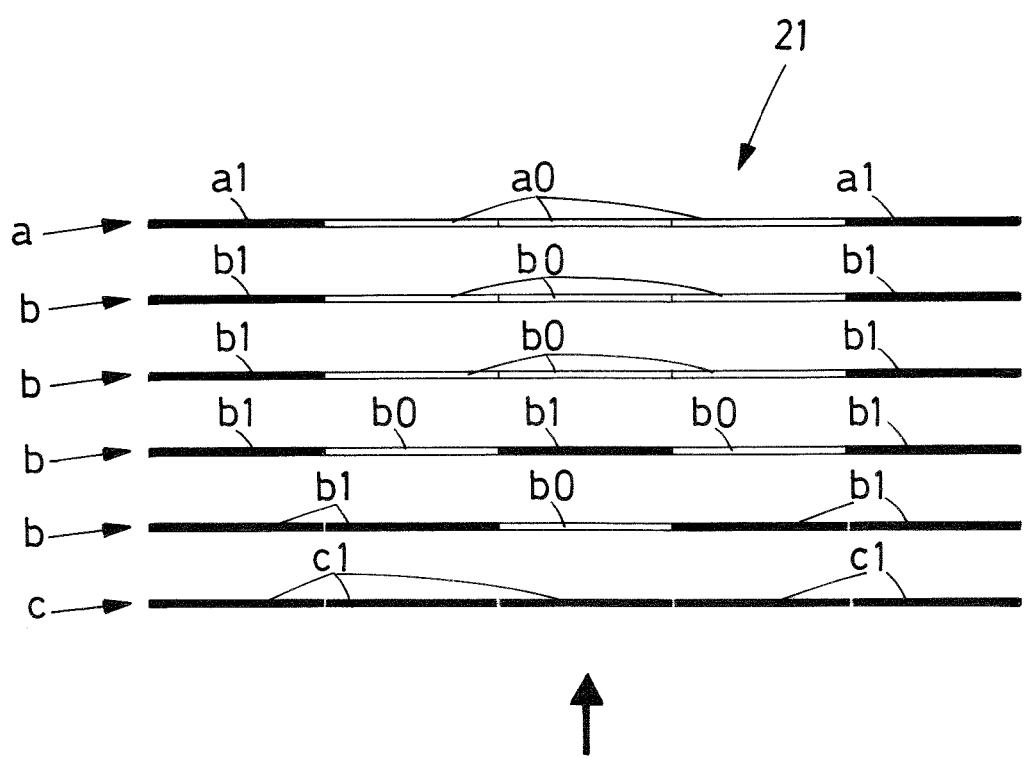
FIG. 8 schematically illustrates the configuration of an effective spot in accordance with an alternative embodiment of the invention.

FIG. 8 schematically illustrates an effective laser spot 21 created by letting the primary spot follow a scanning pattern with six lines a, b, c wherein each line comprises five segments or pixels (a1, a0, b1, b0, c1). For each segment, the laser beam is on (segments or pixels a1, b1, c1) or off (segments or pixels a0, b0), in accordance with a desired energy distribution which can be varied dynamically during the process. Thus, the layout of FIG. 8 thus represents a 6×5 pixelization, and can easily be obtained with commercially available laser and scanning systems. The use of a laser allowing for rapid on/off switching, for example a fiber laser, can increase the number of pixels of the scanning pattern for a predetermined scanning frequency. The number of lines that can be achieved for a certain scanning frequency, such as 50 Hz or 100 Hz or more, will depend, inter alia, on the scanning means used.

Instead of or in addition to simply turning the laser beam on and off, also other laser beam power states can be used, that is, different power levels between the maximum power and zero (or close to zero) power. The power states corresponding to different segments can be stored in a memory, and be dynamically modified during the process so as, for example, adapt the energy distribution to the three-dimensional configuration of the sheet metal object, to the desired width of a track to be heat treated, etc. This segmented or pixelized approach is very practical and allows the user to find appropriate energy distributions along and across the effective laser spot by trying different combinations of power states, that is, the power that the beam should have at different segments, until finding a combination that provides a desired result. If the laser allows for rapid switching between different power states or levels, a high number of segments can be completed per second, allowing for a sufficiently high rate of repetition of the scanning pattern to avoid substantial temperature fluctuations between subsequent repetitions of the scanning pattern, while at the same time accommodating a reasonable amount of segments. For example, when the laser allows for 1000 changes of power state per second, a scanning pattern repetition frequency of 100 Hz can be combined with a scanning pattern having 10 segments. Instead of or in addition to modifying the power state or level of the laser beam, the scanning velocity can be adapted so that it is different in correspondence with different segments or pixels.

Figure 9:
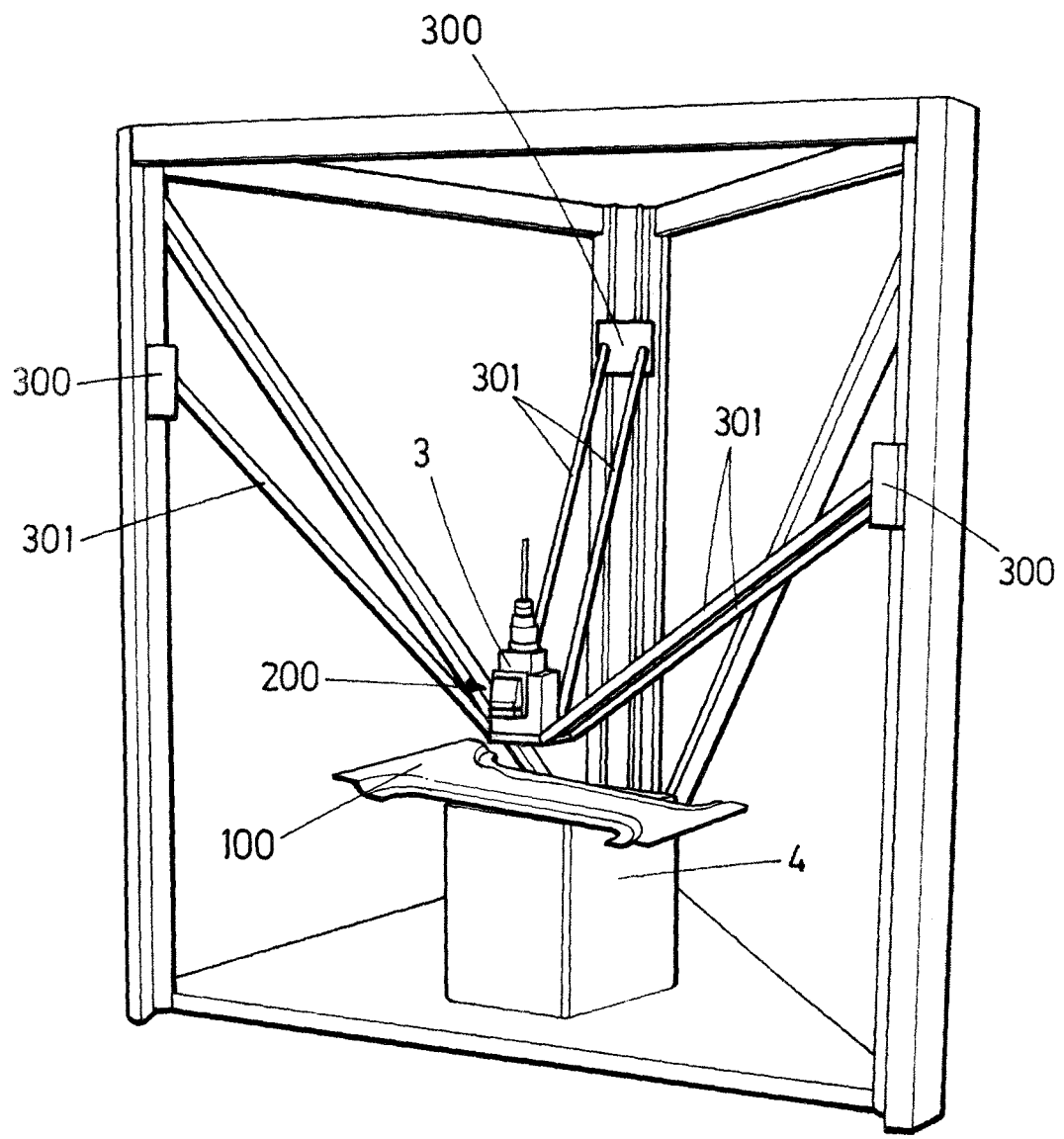
FIG. 9 illustrates an embodiment of the invention including means for displacing the scanner in relation to an object subjected to heat treatment.

FIG. 9 schematically illustrates how a processing head 200, in accordance with one possible embodiment of the invention, can include a scanner 3 arranged to be displaced in relation to a sheet metal object 100 to be subjected to heat-treatment, in this case, a pillar for a vehicle. The processing head 200 is connected to actuators 300 through linkages 301. In this embodiment of the invention, the displacement is based on the parallel manipulator concept. However, any other suitable means of displacement of the processing head can be used, such as a robot arm, etc. In some embodiments of the invention, it is the object being produced that is displaced in relation to the processing head. Also, a combination of these two approaches can be used. In FIG. 9, the sheet metal workpiece 100 is supported by schematically illustrated support means 4.

Figure 10B:
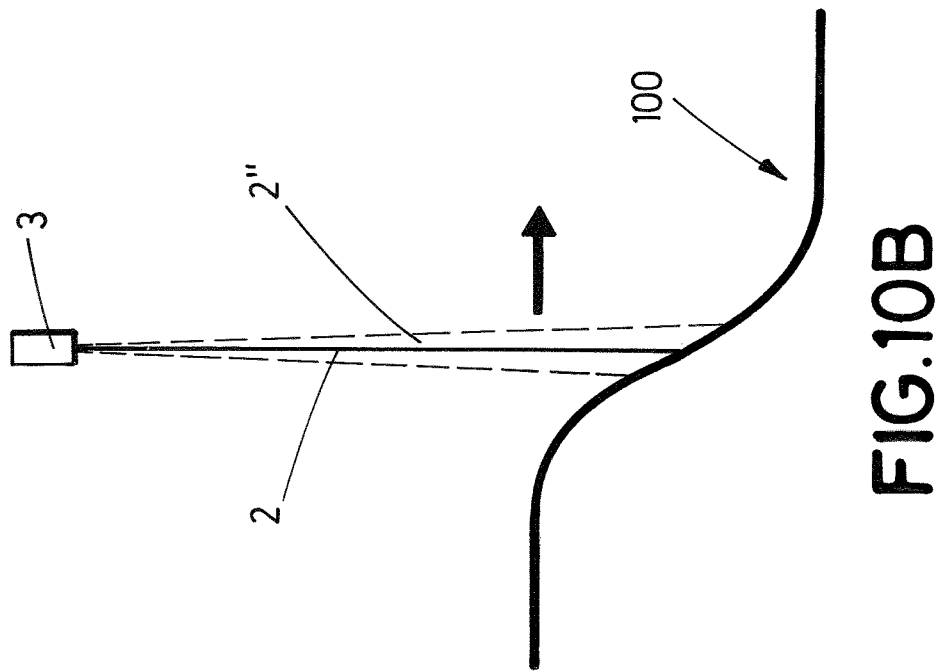
FIGS. 10A and 10B schematically illustrates two stages of heat treatment of a workpiece having a surface with curves or bends.
Figure 10A:
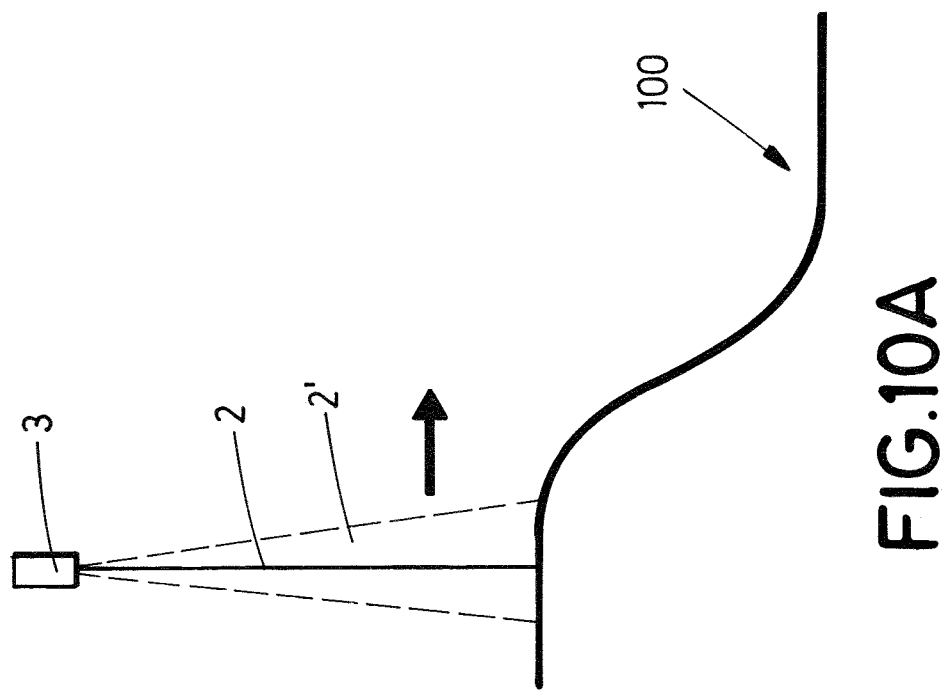

FIGS. 10A and 10B schematically illustrate heat treatment of a workpiece 100 with a surface that features curves or bends, for example, after having been shaped in a press. This is often the case with sheet metal vehicle components. The arrow schematically illustrates how the energy beam 2 and the effective spot move in relation to the surface of the object, for example, by displacement of the scanner 3 in relation to the workpiece 100, by displacing the workpiece 100 in relation to the scanner 3, or a combination thereof. When the effective spot arrives at a bent portion of the workpiece, there is a change in angle of incidence between the energy beam 2 and the surface of the object. To maintain the characteristics of the heating that is taking place, it can be desired to adapt the two-dimensional energy distribution of the effective spot. FIGS. 10A and 10B schematically illustrate how this can be achieved by, for example, modifying the scanning pattern, for example, by reducing the extension of the scanning pattern, so as to increase the power density in the area swept by the beam, perpendicular to the beam. FIGS. 10A and 10B schematically illustrate how the scanning pattern is modified by reducing the extension of the area swept by the energy beam, that is, reducing from the comparatively wide sweep 2' of FIG. 10A to the more narrow sweep 2" of FIG. 10B. And not only this: the distribution of the energy within the effective spot can be selected appropriately and adapted to the curvature of the surface within different portions of the effective spot, so that heating is carried out in an optimal manner. This is just one example of how the two-dimensional energy distribution can be adapted to accommodate for variations in the surface being heated and of how the teachings of the invention can be used for the heat treatment of more or less complex surfaces, adapting the two-dimensional energy distribution within the effective spot and/or within the area swept by the energy beam in a plane perpendicular to the beam, by adapting for example the scanning pattern, the power of the energy beam during different segments of the scanning pattern, and/or the velocity of the primary spot along different segments of the scanning pattern. All of this can be achieved by software and without any need for complex and adaptable optics.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method for heat treatment of an object of sheet metal, comprising the step of heating at least one selected portion of the object using an energy beam;

wherein the beam is projected onto a surface of the object so as to produce a primary spot on the object, the beam being repetitively scanned in two dimensions in accordance with a first scanning pattern so as to establish an effective spot on the object, said effective spot having a two-dimensional energy distribution, wherein said effective spot is displaced in relation to the surface of the object to progressively heat said at least one selected portion of the object, and wherein the two-dimensional energy distribution of the effective spot is dynamically adapted during displacement of the effective spot in relation to the surface of the object, in response to at least one change in angle between the energy beam and a portion of the surface of the object being heated by the effective spot during displacement of the effective spot.

2. The method according to claim 1, wherein adaptation of the two-dimensional energy distribution of the effective spot is carried out by adapting the power of the beam.

3. The method according to claim 2, wherein adapting the power of the beam comprises selectively turning the beam on and off.

4. The method according to claim 1, wherein adaptation of the two-dimensional energy distribution of the effective spot is carried out by adapting the first scanning pattern.

5. The method according to claim 1, wherein adaptation of the two-dimensional energy distribution of the effective spot is carried out by adapting the velocity with which the primary spot moves along at least a portion of the first scanning pattern.

6. The method according to claim 1, wherein focus of the beam and/or the size of the primary spot are dynamically adapted during displacement of the primary spot along the first scanning pattern and/or during displacement of the effective spot in relation to the surface of the object.

7. The method according to claim 1, wherein, during at least one stage of the method, the effective spot comprises a leading portion having a higher energy density than a trailing portion of the effective spot, or the effective spot comprises a leading portion having a lower energy density than a trailing portion of the effective spot, or the effective spot comprises an intermediate portion having a higher energy density than a leading portion and a trailing portion of the effective spot, or the effective spot features a substantially constant energy density throughout the effective spot.

8. The method according to claim 1, wherein the average velocity of the primary spot along the first scanning pattern is substantially higher than the average velocity with which the effective spot is displaced in relation to the surface of the object.

9. The method according to claim 1, wherein the beam is scanned in accordance with said first scanning pattern so that said first scanning pattern is repeated by the beam with a frequency of more than 10 Hz.

10. The method according to claim 1, wherein the size of the effective spot is more than 4 times the size of the primary spot.

11. The method according to claim 1, wherein the first scanning pattern comprises a plurality of lines.

12. The method according to claim 11, wherein said lines are substantially parallel lines.

13. The method according to claim 1, wherein the first scanning pattern is a polygon.

14. The method according to claim 1, wherein said first scanning pattern comprises at least three segments, and wherein said scanning of the energy beam is carried out so that said beam follows at least one of said segments more frequently than it follows at least another one of said segments.

15. The method according to claim 14, wherein the first scanning pattern comprises at least three substantially parallel lines distributed one after the other in a first direction, said lines extending in a second direction,
wherein said at least three lines comprise a first line, at least one intermediate line, and a last line arranged one after the other in said first direction,
wherein said scanning of the beam is carried out so that said beam follows said intermediate line more frequently than said beam follows said first line and/or said last line.

16. The method according to claim 14, wherein the first scanning pattern comprises at least three substantially parallel lines distributed one after the other in a first direction, said lines extending in a second direction,
wherein said at least three lines comprise a first line, at least one intermediate line, and a last line arranged after each other in said first direction,
and wherein the scanning of the beam is carried out such that the beam is scanned along said lines according to a sequence in accordance with which the beam, after following said first line, follows said intermediate line, said last line, said intermediate line, and said first line, in that order.

17. The method according to claim 15,
wherein said first scanning pattern comprises a plurality of said intermediate lines, and/or
the beam is displaced with a higher velocity along said at least one intermediate line than along said first line and last line,
and/or
wherein the first scanning pattern further comprises lines extending in said first direction, between the ends of the first, last and intermediate lines, whereby said beam follows said lines extending is said first direction when moving between said first line, said intermediate lines and said last line, wherein, optionally, the beam is displaced with a higher velocity along said lines extending in the first direction, than along said first line and said last line.

18. The method according to claim 14, wherein the beam is displaced along said first scanning pattern while maintaining the power of the beam substantially constant.

19. The method according to claim 1, wherein the energy beam is a laser beam.

20. The method according to claim 1, wherein the object is a vehicle body component.

21. The method according to claim 20, wherein the vehicle body component comprises a structural component.

22. The method according to claim 21, wherein the structural component comprises a vehicle pillar.

23. The method according to claim 1, wherein the object is a previously at least partially hardened object, and wherein the step of heating at least one selected portion of the object using an energy beam is carried out so as to reduce the hardness of at least a portion of the object.

24. The method of claim 1, wherein the object is a structural vehicle component, and wherein the step of heating at least one selected portion of the object using an energy beam is carried out so as to establish at least one preferred zone of deformation in the case of a crash.

25. The method according to claim 1, wherein at least one of
power of the energy beam,
the first scanning pattern and
a velocity with which the primary spot moves along at least a portion of the first scanning pattern,
is adapted in response to the at least one change in angle between the energy beam and the portion of the surface of the object being heated by the effective spot during displacement of the effective spot, to dynamically adapt the two-dimensional energy distribution of the effective spot.

* * * * *